United States Patent [19]
Fitzner

[11] Patent Number: 4,875,457
[45] Date of Patent: Oct. 24, 1989

[54] APPARATUS AND METHOD FOR PROTECTING ENGINE ELECTRONICS FROM RADIO FREQUENCY INTERFERENCE

[75] Inventor: Arthur O. Fitzner, Fond du Lac, Wis.
[73] Assignee: Brunswick Corporation, Skokie, Ill.
[21] Appl. No.: 232,798
[22] Filed: Aug. 16, 1988
[51] Int. Cl.$^4$ .......................... H04B 1/10; F02P 15/00
[52] U.S. Cl. ...................................... 123/633; 333/12; 364/431.12; 439/607
[58] Field of Search .......................... 123/633; 333/12; 361/400; 364/431.04, 431.12, 574; 439/607

[56] References Cited
U.S. PATENT DOCUMENTS
4,384,331  5/1983  Fukuhara et al. ................ 333/12 X

FOREIGN PATENT DOCUMENTS
162772  9/1983  Japan .................................. 123/633

*Primary Examiner*—Tony M. Argenbright
*Attorney, Agent, or Firm*—Andrus, Sceales, Starke & Sawall

[57] ABSTRACT

A system and method for its implementation for suppressing RFI effects on an electronic control module enclosed in a metal housing includes inserting a plurality of high frequency shunts in the wires attached to the module through the housing. The shunts, comprising by-passing capacitors include one capacitor on the incoming wire disposed closely adjacent the housing and grounded thereto and another capacitor on each wire disposed closely adjacent the connection of the wire to the active circuit of the module and grounded to the circuit ground network. The housing includes a direct connection to ground and the ground network for the electronic module has a single ground connection to the housing.

15 Claims, 2 Drawing Sheets

APPARATUS AND METHOD FOR PROTECTING ENGINE ELECTRONICS FROM RADIO FREQUENCY INTERFERENCE

BACKGROUND OF THE INVENTION

The present invention relates to a system for improving the RFI noise immunity of electronic circuits and, more particularly, to a system for shielding the engine electronics used on internal combustion engines from spark ignition RFI, particularly where the electronics are of necessity located in close proximity to the RFI source.

It is well known that high voltage ignition systems are one of the worst sources of radio frequency interference (RFI). In many internal combustion engines, electronic control modules are utilized to control such functions as spark ignition and fuel injection. When utilized in compact design environments, such as for example in outboard boat motors, the electronic control modules are often crowded under an enclosing cowling and located unavoidably close to a very powerful source of RFI.

For example, the second side of an ignition coil can develop 15,000 volts immediately before spark plug gap breakdown and discharge. In some cases, the voltage may even reach levels as high as 30,000 volts. The wave front which is generated by an almost instantaneous voltage drop from 15,000 volts to essentially zero volts results in the radiation of electromagnetic interference signals over a wide band. Typically, however, there is a concentration of energy at frequencies in the range of approximately 150 megahertz. These instantaneous bursts of high frequency RFI can induce voltages in nearby conductors, including the wires to and from a nearby electronic control module. Such voltage transients may be induced in nearby wires as a result of the high currents at high frequencies accompanying the spark discharge or the stray capacitance coupling to a high tension lead could also cause a voltage change in a closely positioned wire. Thus, a 15,000 volt transient on the high tension leads of an ignition system might easily induce a 1500 volt transient in a lead to or from an engine electronic control module which includes the usual PC board construction. In a typical lead wire having a typical characteristic impedance of about 150 ohms, a 1500 volt voltage transient will be accompanied by a 10 amp current transient and an injection of a current of that magnitude into a circuit is likely to cause a potential change at that point in the circuit relative to other parts of the circuit.

It is, of course, known to use suppressor spark plugs to reduce RFI noise from spark ignition systems. However, because suppressor plugs may occasionally not function as intended, a single unsuppressed firing could generate a very strong RFI signal and cause a serious electronic circuit malfunction or failure. Also, in high performance outboard motors using fast rise time capacitive discharge ignition systems, the typical automotive resistor-type suppressor spark plugs cause a drop in power output plus a noticeable reduction in the smoothness of engine idle. For this reason suppressor plugs are not universally used in outboard motors.

RFI transients are particularly troublesome in digital electronic systems. A voltage transient as low as 5 volts is normally sufficient to change a bit in a digital system from digital zero to one or vice versa. Furthermore, a dropped or added digital bit may become temporarily locked in a digital circuit if it is not immediately self-correcting. Thus, an improper logic state may remain locked in for a significant period of time, resulting in a control malfunction. Analog circuits are also susceptible to malfunctions as a result of transient RFI voltages, for example, timing circuits may be caused to operate out of proper sequence by a transient voltage. Ordinarily, however, analog circuits tend to be immediately self-correcting. Thus, the problems caused by RFI are generally much more serious in a digital circuit.

Electronic modules are often shielded against RFI by enclosing them in metal housings. Such metal housings do tend to protect the printed circuit board of the module inside the housing from externally generated electromagnetic fields. Nevertheless, electronic modules used on internal combustion engines still tend to experience problems with spark plug RFI. One of the primary sources of trouble is in the wires entering the module through the housing which pick up and conduct into the housing the strong transient voltages induced from the firing of the spark plugs.

It is known to use RFI suppressing by-pass capacitors to prevent high frequency voltage transients on the wires from reaching the inputs of amplifiers, logic gates, etc. on the PC board inside the housing. Typically, however, such by-pass capacitors are located to merely shunt the RFI voltage transients directly to the ground network on the PC board. These transient voltages are accompanied by strong transient currents and shorting the transient voltage directly to the circuit board ground, via a by-passing capacitor, will result in an instantaneous injection of an electric charge at that point. As a result, the potential at the point of injection will also instantaneously change relative to other parts of the ground network. Should the potential difference be high enough, e.g. about 2.5 volts or more, a logic signal from one digital device located at one point on the ground network may be read as at an opposite state by another digital device located at another point on the ground network, which is at a different relative potential.

Among the wires typically entering the control module through the housing is a ground wire from the engine block. Often, the ground wire extends directly to a connection on the PC board ground network. However, transient high frequency electrical charges induced in the ground wire are then carried directly to the PC board.

The metal housing itself may also experience induced voltages, resulting in a potential difference between opposite ends of the housing. If all four corners of the PC board inside are grounded to the housing, as is often done in conventional design, the potential difference across the housing could also introduce disturbances to the PC ground network.

Also, shielded cables are frequently used to bring low level signals into an electronic module. If the conductive shield on such a cable is allowed to pass directly to the PC board ground network, there will be another potential source of induced transient voltages being transmitted directly to the PC board ground network.

Thus, attempts to provide RFI suppression and shielding for electronic circuit modules has often been ineffective, particularly in high RFI environments where design requirements dictate close proximity between the RFI source and the electronic circuitry, either digital or analog. The generally-accepted assumption that the ground network for a PC board is always a true system ground, even under the varying influences of RFI transients, is believed to be the major source of the problem.

SUMMARY OF THE INVENTION

In accordance with the present invention, a system for suppressing induced RFI in an orderly and logical manner is presented. The invention is based on the premise that conventional suppression techniques which do no more than facilitate the sudden flow of transient electrical charges into the PC board ground network are only marginally effective.

The system of the present invention may be applied to a conventional electronic module which includes the usual PC board or boards, enclosed in a metal housing and to which external conductors are connected which extend through a wall of the housing and are connected to the PC board circuitry. The system includes an external ground connection (for example, from the engine block) which goes directly to the metal housing. Transient electrical charges entering the module on the ground wire will thus first be substantially dispersed into the housing. If the ground wire continues on to the PC board, very little transient charge will actually go to the PC board. Each of the other conductors entering the housing is provided with an RFI voltage shunt (in the form of an RFI bypass capacitor) connecting the conductor directly to the housing closely adjacent to its entry point. Any high frequency RFI transient voltages appearing on these conductors are thus substantially shorted to the housing, that is, to a ground that is essentially isolated from the ground network of the PC board or boards comprising the electronic control module. In addition, a second level RFI voltage shunt (in the form of a second RFI bypass capacitor) is inserted between each conductor and the PC board ground network at the point closely adjacent the connection of the conductor to the PC board active circuit area itself. Any remaining transient currents, not removed by the first RFI shunts, will be dissipated. Finally, a single ground connection is made between the ground network of the PC board and the housing. In this manner, any induced potential differential from one point on the housing to another would not introduce a corresponding disturbance in the PC board ground network.

Each of the first and second RFI voltage shunts preferably comprises a non-inductive by-passing capacitor. Connection between each of the first by-passing capacitors and the housing is preferably made via a common low-inductance RFI-intercepting ground bus. The RFI-intercepting ground bus may be constructed independently and conductively attached directly to the housing or may comprise a conductive trace on the circuit board isolated from the ground network for the active circuits and independently grounded to the housing.

Additional isolation of the PC board from high frequency transient current may also be provided by inserting a high frequency series impedance in each conductor between the first and second RFI voltage shunts, that is, between the first and second bypassing capacitors.

Should any of the conductors entering the housing for connection to the control module include a shielded cable, the conductive outer shield of the cable should also be grounded directly to the housing at the point of entry. Alternately, the cable shield may be grounded to the RFI-intercepting ground bus.

The method of the present invention for suppressing engine spark ignition RFI includes certain basic steps which appear to be essential for effective suppression in high RFI environment, such as are encountered in an outboard motor. The steps comprising the basic method, as well as the optional additional steps, amy be selected depending on the severity of the RFI, based on such considerations as the proximity of the electronic control module and the lead wires associated therewith to the RFI sources, the lengths of the lead wires and their location and relation to one another, etc.

DETAILED DESCRIPTION OF THE PREFERRED EMBODIMENT

Figure 1:
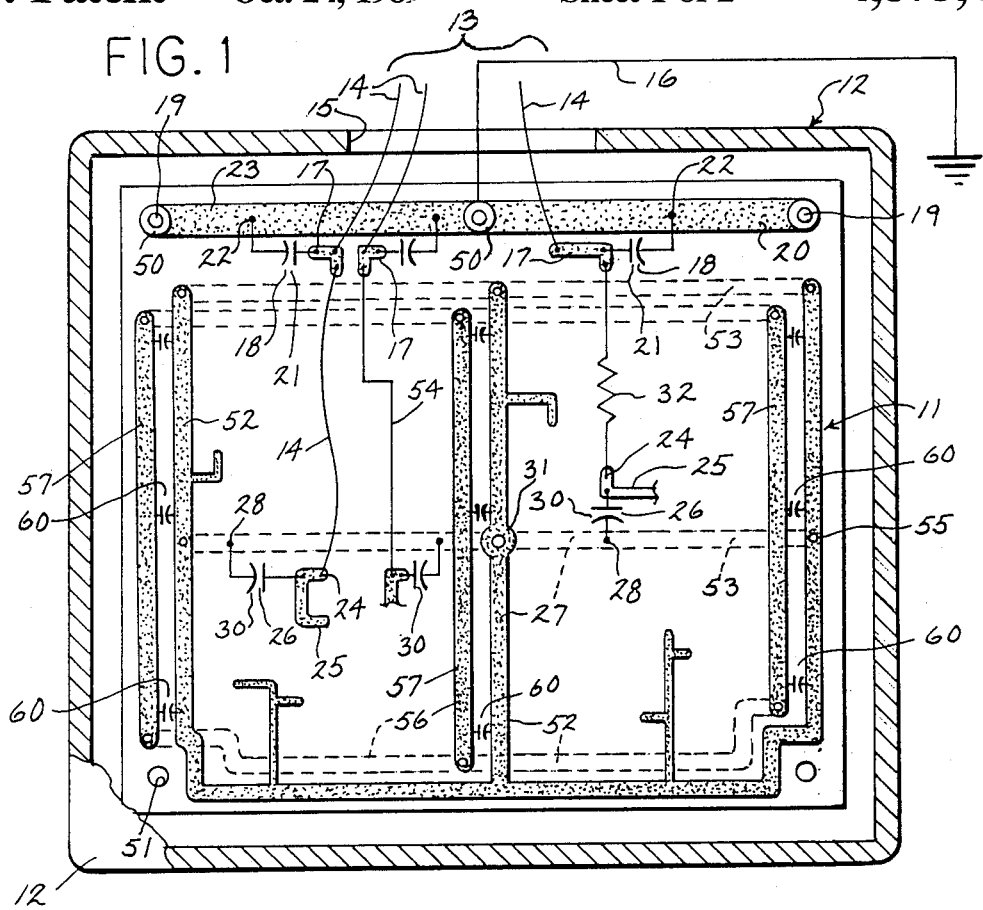
FIG. 1 is a generalized schematic of an electronic control module, showing in illustrative plan view a two-sided PC board and incorporating the RFI suppression system of the present invention.

An electronic control module 10 includes a two-sided printed circuit board 11 mounted inside a metal housing 12. A group of conductors 13, comprising wires 14 or cables, extend from the outside, through an opening 15 in a wall of the housing 12 for eventual connection to the PC board 11. One of the wires 14 typically comprises a ground connection 16 which, in the case of an engine control module, is attached at its outside end to the engine block.

Each of the wires 14 entering the housing 12 through the opening 15 is provided with a first termination 17 at a point very closely adjacent its entry into the housing. A first RFI voltage shunt 18 is connected between each first termination 17 and the housing 12. The connection may be made directly to the housing or may be intermediately attached via a common low-inductance RFI-intercepting ground bus 20 which is, in turn, grounded directly to the housing.

Each of the first RFI voltage shunts preferably comprises a first non-inductive by-passing capacitor 21. Any high frequency RFI transient voltages which may appear on the incoming wires 14 will be substantially shorted out to ground via the housing 12 and ground connection 16 which are separated from and not likely to electrically affect the ground network or the circuitry on the PC board 11. The connecting leads of each capacitor 21 must be kept as short as possible to provide low inductance and the capacitor itself must be of a non-inductive construction. The intercepting ground bus 20, to which the ground lead of each capacitor 21 is attached as at 22, may be a separate conductive strip or may comprise a conductive ground trace 23 on the PC board 11. In either case, the intercepting ground bus 20 or ground trace 23 should be effectively isolated in a high-frequency sense from the active circuits of the control module 10. In addition, the ground bus 20 or ground trace 23 should include multiple direct ground connections 19 to the housing 12.

From their first terminations 17, each of the wires 14 typically continues to the PC board 11 to a circuit connection 24 in an active circuit trace 25 on the board. In lieu of wires 14 from the point of first termination 17, the conductor may comprise a PC board trace 54 forming part of an active circuit trace 25.

Very close to the connection 24 of the wire 14 (or trace 54) to the active circuit trace 25, a second shunt 26 is connected between the trace 25 and the ground network 27 for the circuits on the PC board 11. The ground network 27, in the embodiment shown, is shown as an isolated network in FIG. 2, and the second shunts 26 are attached thereto via ground network connections 28 comprising conventional soldered leads to plated-through holes extending through the PC board. Each of the second shunts 26 are preferably comprises a non-inductive by-passing capacitor 30. Also, as in the case of the first capacitors 21, short low-inductance leads should be used to connect the capacitors 30 to the wires 14 (or traces 54) and to the PC board ground network 27. The wires 14 or PC board traces 54 connecting the first RFI voltage shunts 18 to the second RFI voltage shunts 26 inherently provide some series inductance. This inherent inductance, although small in value, is useful in forcing high-frequency transient currents entering the module on the wires 14 to flow through the bypass capacitors 21 to the housing 12 via the RFI-intercepting ground bus 20, rather than continuing on via the wires 14 or traces 54 into the active circuit area. To maximize the series inductance in a simple manner, wires 14 of the smallest practical diameter, or traces 54 of the narrowest practical width, should be used. The first set of by-passing capacitors 21 will thus have diverted most of the high frequency transient RFI from the wires directly to the housing (or to the housing via the ground bus 20). Any remaining transient currents in the wires 14 (or traces 54) will be relatively small and will be diverted into the ground network 27 by the capacitors 30. The ground network 27 should have low resistance and low inductance to minimize local disturbances of the potential of the ground network when the remaining small transient currents are injected into it via the capacitors 30. Ideally, the ground network traces should be substantially wider than the active circuit traces and provide a gridwork or pattern readily accessible to the ground network connections 28.

Figure 2:
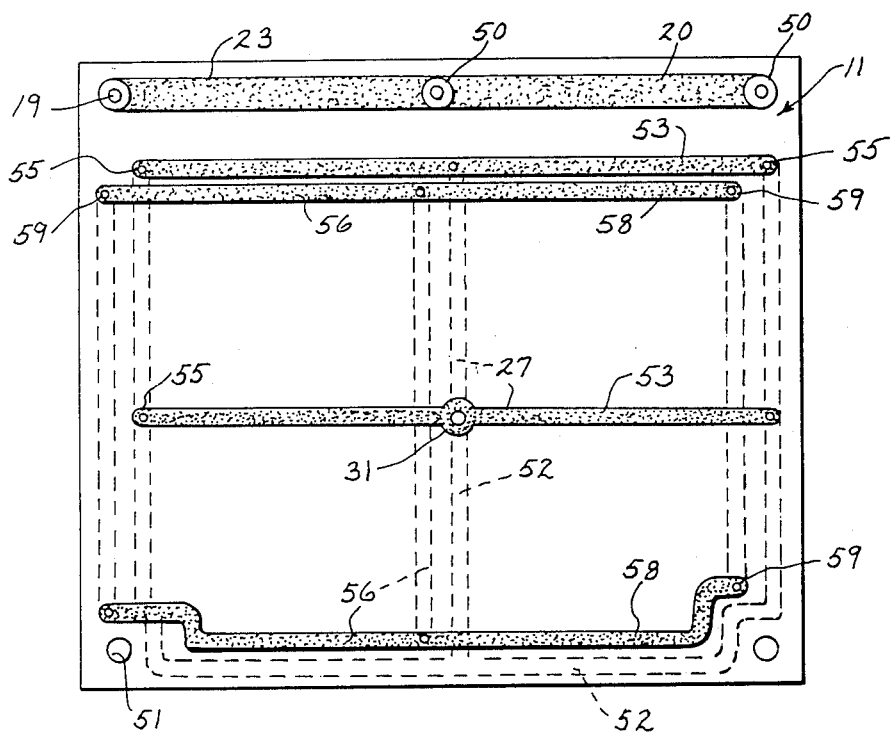
FIG. 2 is a plan view similar to FIG. 1 showing the major conductors and other key elements of the suppression system with the top side shown in phantom to better illustrate the complementary bottom side ground and supply traces.

FIG. 2 shows the essentials of the grounding system and the DC supply voltage network on the bottom side of the PC board. RFI-intercepting ground bus 20 is shown with three large-hole-diameter feed-through pads 50. The large diameter holes in the feed-through pads 50 are of sufficient size to allow PC board 11 to be attached with mounting bolts to the housing 12. The inside walls of the holes are plated with copper or other suitable electrically conductive material so that there is an effective electrical connection from the RFI-intercepting ground bus 20 on the top side of the board to an identical superimposed RFI-intercepting ground bus 20 on the bottom side of the board. Also, it should be understood that the small feed-through type component mounting holes typically provided for making the ground attachments to the capacitors 30 have not been shown in the ground network 27. In addition, active circuit traces and circuit components which could be included on the bottom side of the board have been left out for clarity.

Holes 51 are provided with PC board 11 merely for mounting purposes.

The DC ground network 27 for the active circuit area of PC board 11 is comprised of top side trace 52 and bottom side traces 53. Top side trace 52 is itself comprised of three essentially vertical traces and one horizontal trace, all joined into one trace 52 as shown. The bottom side traces 53 are electrically connected to top side trace 52 by means of feed-through connections 55 and the large-hole-diameter feed-through at 31, thus forming a DC ground network in the form of a grid.

The DC supply voltage network 56 is comprised of top side traces 57 and bottom side traces 58, all of which are electrically connected into a second grid pattern by feed-through connections 59.

DC supply voltage noise-suppression capacitors 60 effectively short the DC supply voltage grid 56 to the DC ground network grid 27 for high frequencies. Consequently, for purposes of understanding the RFI-suppression features of the invention, it is permissible to assume that the two grids are merged into a single equivalent transient voltage ground network 27 having a reduced level of resistance and inductance for high frequency transient currents.

The ground network 27 is connected to the housing at only one point by means of a single mounting bolt through the large-hole-diameter feed-through at 31. This precludes any transient potential difference between one end of the housing and another from inducing a potential disturbance in the PC ground network 27, which might otherwise occur if there were multiple ground connections between the ground network and the housing.

It is, of course, understood that for purposes of illustrative clarity no holes other than the joining feed-through connections have been shown in the overall grid structures of FIGS. 1 and 2. Finally, the numerous DC supply voltage noise suppression capacitors 60 normally used and as shown in FIG. 1, have not been shown on FIG. 2.

Should any of the incoming wires 14 comprise a co-axial or shielded cable, the conductive outer shield should be grounded directly to the housing near its point of entry. Such connection may be directly to the housing 12 or to the ground bus 20 in the same manner as with the ground connection 16.

If the RFI transients to which the electronic control module 10 is exposed are particularly strong, a high frequency series impedance 32 may be inserted in the wire 14 (or trace) between the capacitors 21 and 30. Such a series impedance will help to further filter out relatively large high frequency transient currents which might otherwise not have been adequately shunted to the ground bus 20 by the first capacitors 21. An appropriate series impedance 32 may comprise a ferrite bead or beads, an RF choke, a resistor, or some combination thereof.

Figure 3:
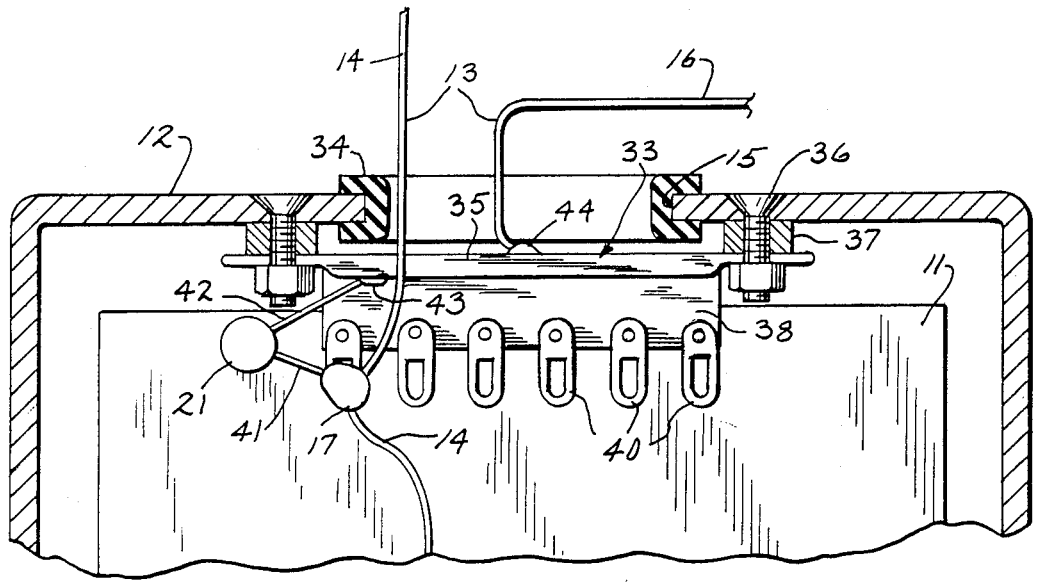
FIG. 3 shows a portion of an electronic control module utilizing an RFI-intercepting ground bus separate from the PC board.

In FIG. 3, there is shown a portion of an electronic control module which utilizes an RFI-intercepting ground bus that is separate from the PC board. In those applications where it may be inconvenient or impossible to provide a conductive ground trace 23 on the circuit board itself, the RFI-intercepting ground bus may comprise a separate conductive member attached directly to the housing 12.

In the embodiment shown, the intercepting ground bus 20 comprises a separate terminal strip 33 attached to the inside wall of the housing adjacent the opening 15 for the conductors 13. The opening 15 may be surrounded with a conventional insulating grommet 34 through which the various conductors 13 pass. The terminal strip 33 includes a conductive base 35 attached to the housing 12 with conductive fasteners 36 and spacers 37. An insulating strip 38 extends out from the base 35 and includes a series of isolated terminals 40.

Each of the incoming wires 14 for which it is desired to provide RFI suppression is severed immediately after its entry into the housing and attached to a terminal 40, as with a soldered connection, to provide a first termination 17. The soldered connection or the first termination 17 also provides a point for connection of the other end of lead wire 14 and one lead 41 of a first bypassing capacitor 21. The other lead 42 of the capacitor 21 may be conveniently attached with a soldered or welded connection 43 directly to the base 35 of the terminal strip 33. The ground wire 16 may be soldered or welded directly to the conductive base 35 of the insulating strip at a convenient connecting point 44 or, alternatively, could be attached to the base via one of the fasteners 36.

RFI is not easily quantifiable nor are the effects of RFI on digital or analog circuits easily predicted. Nevertheless, the adverse effects of RFI on electronic circuits, particularly digital circuits, must be eliminated or reduced to levels which the circuit can tolerate. The system and method disclosed herein, though incapable of precise quantitative definition, has been found in its minimum configuration to provide fully adequate RFI suppression for electronic circuits operating in extremely strong RFI environments, namely, the compact environment of the spark ignition system in an outboard motor.

I claim:

1. In an electronic control module including electronic circuit means, a metal housing and external conductors extending through the housing and having electrical connections to the circuit means, a system for suppressing RFI signals induced in the conductors and entering the electronic module via the conductors comprising:
   an external ground connection to the housing;
   first RFI voltage shunt means connecting each conductor to the housing closely adjacent its entry through the housing;
   second RFI voltage shunt means connecting each conductor to the ground network for the circuit means closely adjacent the connection of the conductor to the circuit means; and,
   a single ground connection between the housing and the ground network for the circuit means.

2. The system as set forth in claim 1 wherein the first RFI voltage shunt means comprises a non-inductive by-passing capacitor for each conductor.

3. The system as set forth in claim 2 including a common low-inductive RFI-intercepting ground bus connecting each capacitor to the housing.

4. The system as set forth in claim 3 wherein the electronic circuit means comprises a printed circuit board and the RFI-intercepting ground bus comprises a conductive trace on the circuit board effectively isolated from the circuit means.

5. The system as set forth in claim 2 wherein the second RFI voltage shunt means comprises a second non-inductive by-passing capacitor for each conductor.

6. The system as set forth in claim 5 including a high frequency series impedance in each conductor between the first and second shunt means.

7. The system as set forth in claim 3 wherein the RFI-intercepting ground bus comprises a terminal strip conductively attached to the housing, said strip including terminal means for effecting connection of each first RFI voltage shunt means.

8. The system as set forth in claim 7 wherein the internal ground connection to the housing comprises an intermediate connection to the terminal strip.

9. A method of suppressing engine spark ignition RFI in an electronic engine control module including a metal housing enclosing the module, circuit board means within the housing, and external conductors extending through the housing and operatively connected to the circuit board means, the method comprising the steps of:
   (1) grounding the housing to the engine block;
   (2) inserting first RFI shunt means between the housing and each conductor closely adjacent its entry to the housing;
   (3) inserting second RFI shunt means between each conductor and the ground network for the circuit board means closely adjacent the connection of said conductor to the circuit board means; and,
   (4) establishing a single ground connection between the housing and the ground network for the circuit board means.

10. The method as set forth in claim 9 wherein the first and second RFI voltage shunt means each comprises a by-passing capacitor for each of the conductors.

11. The method as set forth in claim 10 including the step of inserting a high frequency series impedance in at least one of said conductors between the first and second by-passing capacitors.

12. A system for suppressing the effects of engine spark ignition RFI on an electronic module comprising:
   a grounded metal housing enclosing the circuit means;
   external conductors extending into the housing and connected to the circuit means;
   a plurality of high frequency shunts from each of the conductors to ground;
   one of said shunts on each conductor disposed closely adjacent the point of entry of the conductor into the housing and conductively attached thereto;
   another of said shunts on each conductor disposed closely adjacent the point of connection of the conductor to the circuit means and conductively attached to the circuit means ground network; and,
   a single ground connection between the housing and the circuit means ground network.

13. The system as set forth in claim 12 wherein said housing is grounded to the engine.

14. The system as set forth in claim 12 wherein said shunts comprise non-inductive by-passing capacitors.

15. The system as set forth in claim 14 wherein the conductors include at least one shielded cable and further comprising a conductive connection from the outer shield of said shielded cable to the housing closely adjacent the point of entry thereinto.

* * * * *